US007109474B2

(12) United States Patent
Schwartz

(10) Patent No.: US 7,109,474 B2
(45) Date of Patent: Sep. 19, 2006

(54) MEASURING ION NUMBER AND DETECTOR GAIN

(75) Inventor: Jae C. Schwartz, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 65 days.

(21) Appl. No.: 10/783,600

(22) Filed: Feb. 20, 2004

(65) Prior Publication Data

US 2004/0245451 A1 Dec. 9, 2004

Related U.S. Application Data

(60) Provisional application No. 60/476,842, filed on Jun. 5, 2003.

(51) Int. Cl.
*B01D 59/44* (2006.01)

(52) U.S. Cl. ........................ 250/282; 250/281; 250/292

(58) Field of Classification Search ................. 250/282
See application file for complete search history.

(56) References Cited

U.S. PATENT DOCUMENTS

| | | | | |
|---|---|---|---|---|
| 4,746,794 | A * | 5/1988 | French et al. | 250/288 |
| 5,157,260 | A | 10/1992 | Mylchreest et al. | |
| 5,420,925 | A | 5/1995 | Michaels | |
| 5,463,219 | A * | 10/1995 | Buckley et al. | 250/281 |
| 6,265,714 | B1 * | 7/2001 | Shimomura | 250/281 |
| 6,674,068 | B1 * | 1/2004 | Kammei | 250/287 |

OTHER PUBLICATIONS

Parminder Kaur et al., "*Use Of Statistical Methods For Estimation Of Total Number Of Charges In A Mass Spectrometry Experiment*", Analytical Chemistry, 2004, pp. A-G.

Michael J. Kristo and Christie G. Ente, "*System For Simultaneous Count/Current Measurement With A Dual-Mode Photon/Particle Detector*", Rev. Scientific Instruments vol. 59, No. 3, Mar. 1988, pp. 438-442.

William J. Fies, "*A Method For Measuring The Gain Of An Electron Multiplier*", International Journal Of Mass Spectrometry and Ion Processes, vol. 82, Jul. 1987, pp. 111-127.

Keith Birkinshaw, "*Special Feature: Tutorial, Fundamentals Of Focal Plane Detectors*", Journal of Mass Spectrometry, vol. 32, 1997, pp. 795-806.

G. Lakits et al., "*Electron Emission From Metal Surfaces Bombarded By Slow Neutral And Ionized Particles*", Nuclear Instruments and Methods In Physics Research B48, 1990, pp. 597-603.

G. Laktis et al.., "*Statistics Of Ion-Induced Electron Emission From A Clean Metal Surface*", Rev. Scientific Instruments, vol. 60, No. 10, Oct. 1989, pp. 3151-3159.

* cited by examiner

*Primary Examiner*—Nikita Wells
*Assistant Examiner*—Phillip A. Johnston
(74) *Attorney, Agent, or Firm*—Fish & Richardson P.C.; Sharon Upham

(57) ABSTRACT

Method and apparatus, including computer program products, implement techniques for operating a mass spectrometer that includes a source of ions, a mass analyzer, and a detector, in which a gain of the detector or the number of ions detected by the detector is calculated based on intensity measurements for ions having a plurality of different m/z values. In particular implementations, the detector gain or the number of ions detected by the detector can be calculated based on a ratio of or difference between intensity values for at least two of the ions having different m/z values.

30 Claims, 5 Drawing Sheets

MEASURING ION NUMBER AND DETECTOR GAIN

CROSS-REFERENCE TO RELATED APPLICATIONS

This application claims the benefit of U.S. Provisional Application No. 60/476,842, filed on Jun. 5, 2003, which is incorporated by reference herein.

BACKGROUND

This invention relates to mass spectrometry and the measurement of the gain of an ion or particle detector.

In mass spectrometers, charged particles or ions are formed from molecules of a sample of interest and the mass-to-charge ratios of the ions are determined. In many instruments, these ions are ultimately detected by a detector system which contains electron or photo multipliers. In order to assure quantitative values of the number of ions and to optimize signal-to-noise ratios, the gain of the detector system must be known and often set to an optimum value.

The most direct way of measuring gain of a detector system is simply to measure the current going into the detector and the current coming out of the detector using a Faraday Cup or some other electrode. The gain is simply the ratio of the current out divided by the current in. Unfortunately, this technique is not practical in many mass spectrometers since it requires extra ion optical components which are complex, costly, and could hinder the performance of the system as a mass spectrometer. For this reason, other less invasive methods of determining the gain of the detector system are desired.

Many naturally occurring events occur at irregular, random, intervals such as radioactive decay, the arrival of photons from ordinary light sources, and the arrival of ions at a detector. The occurrence of these processes is characterized and controlled by the Poisson type of probability distribution. One consequence of this probability distribution is that the statistical fluctuation or variance of the measured ion intensity reaching the electron multiplier detector, under the appropriate conditions, is directly related to the average (or mean) number of ions detected. Based on this fact, one approach to measuring the gain of an electron multiplier has been described by Fies (International Journal of Mass Spectrometry and Ion Proceedings, 82 (1988) pp. 111–129 (incorporated herein by reference)).

The Fies method depends on taking multiple measurements of the intensity of a single type of ion in order to determine the number of ions measured. Once the number of ions is determined, a simple calculation using the known transfer function of the electronics can yield an ion detector's gain. This method, however, assumes that the variance of the measured ion intensity is solely due to the inherent variance of the ion beam, i.e. basic ion statistics, and that all other sources of irreproducibility are statistically negligible.

As depicted in FIG. 1, all mass spectrometers 100 include a source of ionization 110 which produces ions from a sample, ion transfer optics 120 to deliver the ions from the source to the mass analyzer 130, a mass analyzer 130, and some kind of ion detector system 140. Different types of chemical samples require different types of ionization techniques in order for the sample to be analysed by mass spectrometery. Operation of an Electron Ionization or Electron Impact (EI) source 200 (see FIG. 2) applied to volatile samples begins with the passing of current through wire(s) 210 to produce the electrons 220 that are subsequently used for the ionization process. The number of electrons emitted by the wire can be quite precisely controlled by adjusting the current passing through the wire in an electronic feedback loop based on sensing the emission current. Molecules 230 of the analyte 240 present in the gas phase are then passed through this electron beam, the molecules 230 are caused to lose an electron and analyte ions 250 are produced. The rate at which analyte molecules 230 pass through the electron beam can also be quite accurately controlled, and so an EI source 200 can be operated such that a relatively constant stream of analyte ions 260 is produced. Under these circumstances, the fluctuations in the ion beam intensity due to the stability of the ion source parameters is negligible and such sources therefore satisfy the assumption for the simple method described above. Other types of sources of ionization, including, but not limited to chemical ionization sources, also satisfy the assumption.

Mass spectrometry has seen a significant increase in its use for less volatile samples, including those in the condensed or liquid phase. This growth in applications is due to the development of atmospheric pressure ionization (API) techniques. An example of a mass spectrometer which incorporates an API source is shown in FIG. 3. Atmospheric Pressure Ionization sources (API) 300 are ion sources in which samples, typically in the condensed phase, such as liquids or solids, are ionized directly at atmospheric pressure, and are then transferred to the mass analyzer 395. The sample is typically dissolved in an appropriate solvent before being introduced into the mass analyzer 395 for analysis. The sample ions are transferred into the mass analyzer through a series of differentially pumped stages 310, 320, 330, 340, enabling a large pressure differential to be maintained between the API source 300 and the mass analyzer 395, without using unnecessarily large vacuum pumps.

ElectroSpray Ionization (ESI) is one type of API source. ESI occurs directly from solution at atmospheric pressure and provides highly charged droplets of the solution. In ESI, a capillary or needle has its orifice in close proximity to the entrance into the vacuum system of the mass spectrometer, and a dilute solution, containing the sample molecules of interest, is pumped through the needle. A strong potential, typically 1–5 KV is applied between the needle orifice and an orifice leading to the mass analyzer. This forms a fine "spray" of the liquid solution. The spray of droplets evaporates to produce ions of the sample, and a mixture of ions, droplets and neutral particles enter the mass analyzer via the orifice.

In electrospray ionization, the quality of the mass spectrum is strongly dependent on the quality of the spray emitting from the needle, i.e. on its fineness and its consistency. Since the quality and stability of the spray are strongly dependant on the electric field which in turn is dependent on the mechanical nature of the needle, and also on the liquid flow properties at the tip, stability of the rate of generating ions is often problematic. The quality of the spray can somewhat be determined by direct visualization of the spray and also by monitoring the current emitted from the needle. Some sources also utilize a strong flow of gas to assist in nebulizing liquid samples and to further help break down the solvent droplets. The liquid characteristics, such as viscosity and ionic strength, and the gas characteristics, such as temperature and flow rate, all have an effect on the stability of droplet production and the electrospray process.

Consequently, due to the many parameters involved and to the nature of generating a liquid spray, the stability of the spray, and therefore the production of ions is not stable enough to be neglected compared to the inherent variance of the ion beam, even under optimum conditions. In this type of ion source, there is a temporal instability inherent in the nature of the source. This temporal instability can dominate the observed ion intensity variance and render invalid the assumptions on which methods such as the single ion Poisson statistics method or Fies method depend.

In instruments in which the ion beam from the source is continuously being detected, so called "beam machines", a particular type of ion or single ion m/z can be chosen to be continuously passed to the detector. These types of instruments do not have to scan over a mass spectral peak but can be parked on top (or the side) of a spectral peak and intensity measurements can be made continuously. One consequence of this is that if a measurement of the intensity of another mass is required, this measurement occurs on a different part of the ion beam from the source at a different time. If the source of the ions is unstable, the temporal variation in the ion beam could severely affect the apparent ratio or difference of the intensities of the two different ions.

In instruments in which a fraction or packet of the ions produced in the source is sampled or integrated and then analyzed, there is a time gap between the sampling of the ion beam and measuring their intensities. Thus, a true continuous measurement is not practical. Examples of these "pulsed" or "trapping" types of mass analyzers include ion trap mass spectrometers (both 3D and 2D linear traps, Fourier Transform mass spectrometers, Orbitrap analyzers, and time of flight mass spectrometers). In trying to make continuous ion current measurements, some of these instruments can be put into a transmission mode in which the ions from the source are attempted to be continuously transferred to the detector. However, in this mode no mass analysis is possible and the actual identity of the ions which reach the detector is unknown. Since the actual gain of the detector can depend on the actual ion species which it is detecting, it is desirable to know the identity of the ions for which the gain is measured. Utilization of the same ion to both determine and set the gain of the detector provides consistent results on different instruments, even with different ionization sources.

In the basic method described by Fies, the effects of various sources of error and how to possibly identify them in the results is discussed. The types of errors considered include errors due to bandwidth, noise spikes (voltage spikes induced in the electronic circuits of instruments from outside sources, such as nearby electrical machinery, other poorly shielded instruments, etc.), errors due to zeroing of the electrometer, amplifier noise in excess of shot noise (e.g., coherent noise such as power line-related ripple), digitizing errors (round-off and finite dynamic range), errors due to peak modulation and errors due to electron multiplier noise. Although Fies discloses ways to possibly identify these sources of error, he does not consider methods for eliminating the effects of these noise sources on the results in order to accurately determine the gain. In fact, Fies states clearly that his technique for determining gain depends on the assumption that the system "is free of all noise except for the statistical fluctuations due to the entering ion beam". This invention describes how to do this with respect to at least one specific source of noise, namely ion source instability, but also would apply to other sources of noise which have common mode effects on the different ion intensities.

SUMMARY

The invention provides techniques for determining the number of ions being detected and the gain of an ion or particle detector in a mass selective manner when the source of the ions being detected is temporally unstable. In general, in one aspect, the invention features methods and apparatus, including computer program products, implementing techniques for operating a mass spectrometer that includes a source of ions, a mass analyzer, and a detector. The techniques include calculating the number of ions detected and the gain of the detector based on intensity measurements for ions having a plurality of different m/z values.

Particular implementations can include one or more of the following features. Calculating a gain can include calculating a ratio of intensity values for at least two of the ions having different m/z values, and calculating the number of ions detected and a detector gain based at least in part on the ratio of intensity values. Calculating the number of ions detected $N_a$ and a detector gain G based on the ratio can include using the formulas:

$$\overline{N_a} = \frac{(\overline{I_{mR}})^2(1+\overline{I_{mR}})}{\sigma_{mR}^2}$$

and $$G = \frac{\overline{I_{ma}} * \sigma_{mR}^2}{k(\overline{I_{mR}})^2(1+\overline{I_{mR}})}$$

where $\overline{I_{mR}}$ is the mean of the measured intensity ratio of two ions, $\overline{I_{ma}}$ is a measured average intensity of a single peak corresponding to one of the at least two ions, $\sigma_{mR}^2$ is the square of a standard deviation of the intensity ratio of two ions, and k is a transfer function associated with the detector electronics.

Calculating the number of ions detected ($N_a$) and the detector gain (G) can also include utilizing measurements of the difference between intensity values for at least two ions having different m/z values, and calculating a gain based at least in part on the difference between intensity values. Calculating the number of ions detected $N_a$ and a detector gain G based at least in part on the difference between intensity values can include using formula:

$$\overline{N_a} = \frac{(\overline{I_{ma}})}{(\overline{I_{ma}}+\overline{I_{mb}})\sigma_{mD}^2}$$

and $$G = \frac{\sigma_{mD}^2}{k*(\overline{I_{ma}}+\overline{I_{mb}})}$$

where $\sigma_{mD}^2$ is the square of a standard deviation of the intensity differences between two ions, k is a transfer function associated with the detector, $\overline{I_{ma}}$ is a measured average intensity of a single peak corresponding to a first ion of the at least two ions, and $\overline{I_{mb}}$ is a measured average intensity of a single peak corresponding to a second ion of the at least two ions.

Calculating the number of ions detected and a detector gain can also utilize intensity measurements for at least two ions having different m/z values, and calculating the number of ions and a gain based at least in part on these intensity measurements. Calculating the number of ions detected, $N_a$, and the detector gain G based at least in part on these intensity values can include using the formula:

$$\overline{N_a} = \frac{(\overline{I_{mb}})(\overline{I_{ma}})^2(\overline{I_{mb}} - \overline{I_{ma}})}{(\overline{I_{mb}})^2\sigma_{ma}^2 - (\overline{I_{ma}})^2\sigma_{mb}^2}$$

and $$G = \frac{I_{mb}^2\sigma_{ma}^2 - I_{ma}^2\sigma_{mb}^2}{k * \overline{I_{mb}} * \overline{I_{ma}}(\overline{I_{mb}} - \overline{I_{ma}})}$$

where $\overline{I_{ma}}$ is a measured average intensity of a single peak corresponding to a first ion of the at least two ions, and $\overline{I_{mb}}$ is a measured average intensity of a single peak corresponding to a second ion of the at least two ions, $\sigma_{ma}^2$ and $\sigma_{mb}^2$ are the square of the standard deviations of the intensities of two ions, and k is a transfer function associated with the detector.

The techniques preferably include accumulating ions generated by a source of ions within the mass analyzer, transmitting ions from the mass analyzer to the detector, the ions being selectively transmitted according to their respective m/z values, and measuring intensity values for the transmitted ions to obtain the intensity measurements for the ions having a plurality of different m/z values. The source of ions can be temporally unstable. The intensity measurements obtained for ions having at least two different m/z values can have a substantially constant instantaneous variation contribution. Accumulating ions can include accumulating ions having at least two different m/z values generated by the source of ions at substantially the same time. Accumulating ions can include accumulating ions for an accumulation time, the accumulation time being selected to optimize the intensity measurements.

In particular implementations, the mass analyzer can include a pulse-type analyzer, a trap-type analyzer, or a beam-type analyzer. The source of ions can include an ion source, such as an electrospray ionization source, an atmospheric pressure chemical ionization source, an atmospheric pressure photo-ionization source, a matrix assisted laser desorption ionization source, an atmospheric pressure MALDI source, or a secondary ions ionization source. More stable sources such as electron impact, or chemical ionization could also be used. The mass analyzer can include an ion trap mass analyzer, a Fourier Transform ion cyclotron resonance mass analyzer, an orbitrap mass analyzer, or a time of flight mass analyzer. The detector can include an electron multiplier or photomultiplier.

The invention can be implemented to provide one or more of the following advantages. By calculating detector gain based on an intensity ratio measurement, a difference measurement, in addition to, or solely on absolute intensity measurements, the contribution of source instability can be eliminated. Eliminating the contribution of source instability provides for more reliable calculation of the number of ions detected and therefore the detector gain for trapping or pulsed type instruments.

Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control.

Exemplary embodiments of the invention will now be described and explained in more detail with reference to the embodiments illustrated in the drawings. The disclosed materials, methods, and examples are illustrative only and not intended to be limiting. The features that can be derived from the description and the drawings may be used in other embodiments of the invention either individually or in any desired combination.

BRIEF DESCRIPTION OF THE DRAWINGS

Like reference numbers and designations in the various drawings indicate like elements.

DETAILED DESCRIPTION

A significant limitation of the Fies approach of measuring a single ion intensity is that it assumes that the statistical fluctuation is dominated by the inherent variance of the ion beam and all other sources of instability in the system are negligible. Therefore the Fies technique can only be utilized with relatively stable ionization sources, such as electron impact or chemical ionization sources, which provide a substantially constant flow of ions over time.

Consider an EI source attached to a continuous or beam type mass analyzer such as a quadrupole mass spectrometer or a magnetic sector mass spectrometer, utilizing an electron multiplier as the detector. These type of analyzers typically transmit a single selected m/z to the detector at any given time. A mass spectrum is obtained by scanning the analyzer so that different mass-to-charge-ratio ions are detected at different times while the ion source continuously produces ions of all m/z. While a certain m/z is selected, all ions having other m/z values are lost.

Consequently, beam type mass analyzers, which can have 100% duty cycle when used for continuously measuring a single m/z, have very low duty cycle when scanning a wide range of m/z, and therefore have reduced S/N for this experiment. The Fies based method however only requires the monitoring of a single ion intensity, and so this is not a limitation for applying this method. In this case, the measurement of the gain of the detector is performed on a particular type of ion—that is, a selected m/z. This is, in general, beneficial since different ions can result in different gains of the detector system due to the fact that the process of generating secondary electrons can be vary for the different ion species. Characteristics of ions that can influence the secondary electron emission process include ion cross-section, mass, and charge state of the ion.

Figure 4:
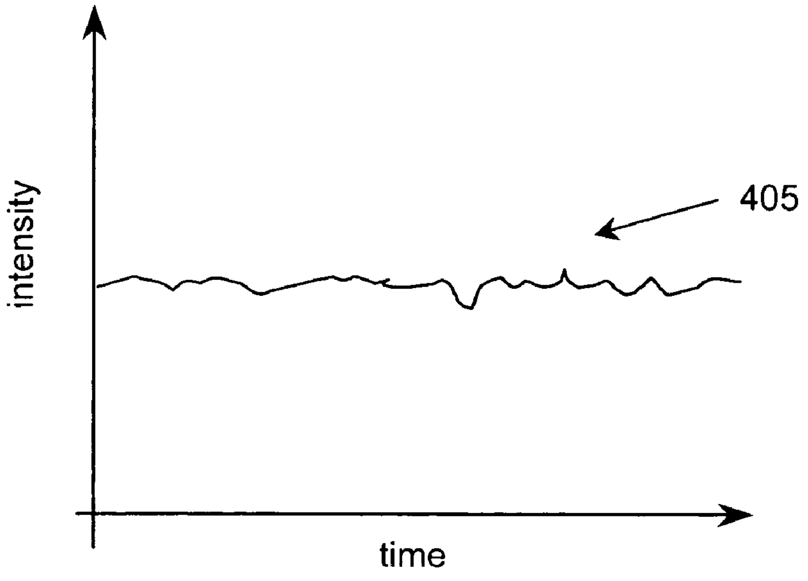
FIG. 4 is a graph showing the relationship between a selected m/z intensity and time for a beam type mass spectrometer.

Accordingly, to apply the Fies technique, the mass analyzer would be set to continuously transmit ions of a certain m/z to the detector. In this case the detector is seeing a constant current and continuous measurements of this ion current can be made by some electronic system with time. An example of the measured data is depicted in FIG. 4. According to Poisson statistics and the mathematics described by Fies, the ion current received from the EI source by the detector will include fluctuations which are inherent in the process of ion formation itself and this variation can then be used to determine the average number of ions in any single measurement of the ion current.

Figure 5:
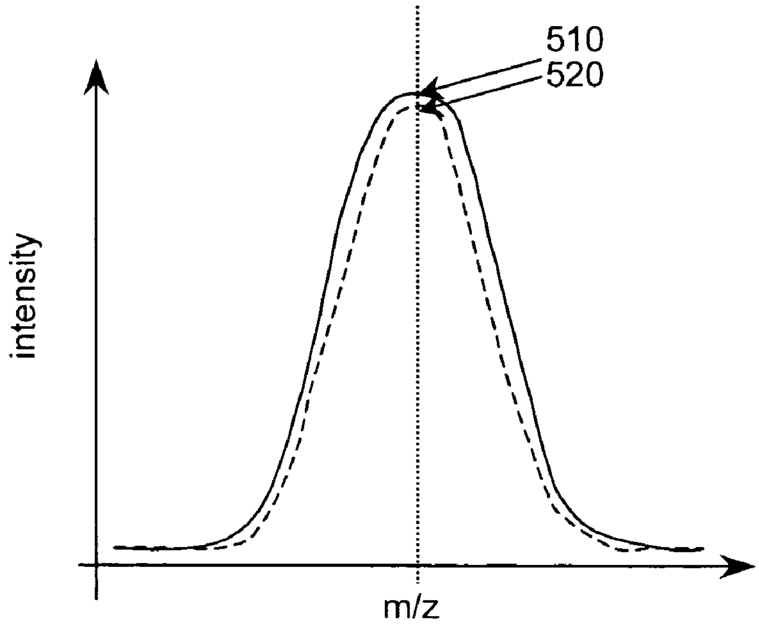
FIG. 5 is a graph showing the relationship between ion intensity and time for either a beam type or trap type mass spectrometer which is scanning. In this case, time is also directly related to m/z.

Applying this method in the same way to trap-type mass analyzers is more difficult. In ion trapping instruments, a sample of ions must first be accumulated in the trap for some period of time. Subsequent to this accumulation, the intensity of a particular m/z or a set of m/z values can be measured by scanning over the mass spectral peak or set of peaks and allow it to be detected. Consequently, for ion trap type mass analyzers, it is extremely difficult to provide a mass selected continuous ion current to the detector as in FIG. 3. It is possible to send some portion of the ions produced by the source to the detector continuously by basically turning off the trapping device and allowing all ions to be transmitted all of the time. However, in this case, no mass selection takes place and so it is unknown what ions are actually reaching the detector and what the detector gain is being measured on. For these systems then, all ions produced by the source are accumulated in the trap. Ions of a particular m/z can then be scanned out of the analyzer at some rate. The resulting data represents the relationship between the intensity of the output signal and the m/z of the signal detected as illustrated in FIG. 5. In this case the measured intensity will peak at a certain m/z value 510, indicating the presence of an ion at that m/z and the integrated intensity of the peak is a measurement of its intensity. A second measurement would then have to repeat the ion accumulation and mass scanning steps to produce a second measured peak (520). This process would be repeated, and the measured variation of the integrated area of this peak along with its mean value, would be used to calculate the average number of ions in the peak. This allows the method to again produce a mass selective measurement in a trapping type of instrument.

In addition to EI and CI ion sources, today samples of interest may be ionized by API sources, such as electrospray ionization, that are inherently less stable than electron impact ionization sources. Electrospray ionization relies on both a high voltage being applied to a spray needle and sometimes also a nebulizing gas to disperse liquid containing a sample into a fine spray of small droplets. The nature of this process is inherently less stable and can contribute significantly to the variation of the ion current with time. Other such unstable sources include, but are not limited to: APCI (atmospheric pressure chemical ionization) sources; APPI (atmospheric pressure photo-ionization) sources; MALDI (matrix assisted laser desorption ionization) sources; AP-MALDI (atmospheric pressure MALDI) sources; and SIMS (secondary ions) sources. In all of these cases, the variation of the ion intensity can have substantial contributions which are not due to the inherent variation of the ion beam, but to the instability of the source itself, rendering the assumption on which the single ion Poisson method or Fies method invalid.

In order to compensate for the source instability, according to the current invention, instead of utilizing measurements of the ion beam intensity at a single m/z value, measurements are taken for two or more distinct m/z values under conditions such that the two or more distinct m/z intensity values have the same contribution from other sources of variation. Under these conditions, the number of ions and the gain of the detector can be calculated, and any contribution of source instability can be eliminated.

The use of more than one m/z can be applied to particular advantage in pulsed-type mass analyzers. In these devices there is a time separation between when ion current is accumulated in the device and when that ion current is mass analyzed and measured. Due to this temporal separation, all m/z ions present will have the identical contribution of any source instability since during the accumulation, any instability of producing the ions is basically integrated into the total ion abundance trapped. This is not the case for beam type instruments, since intensity measurements on two different masses occur at different times on two different sets of ions produced by the source. This would then allow source instabilities to be seen by both of the two measurements independently and not in a common mode and therefore the effects of the instability could not be eliminated.

Figure 6:
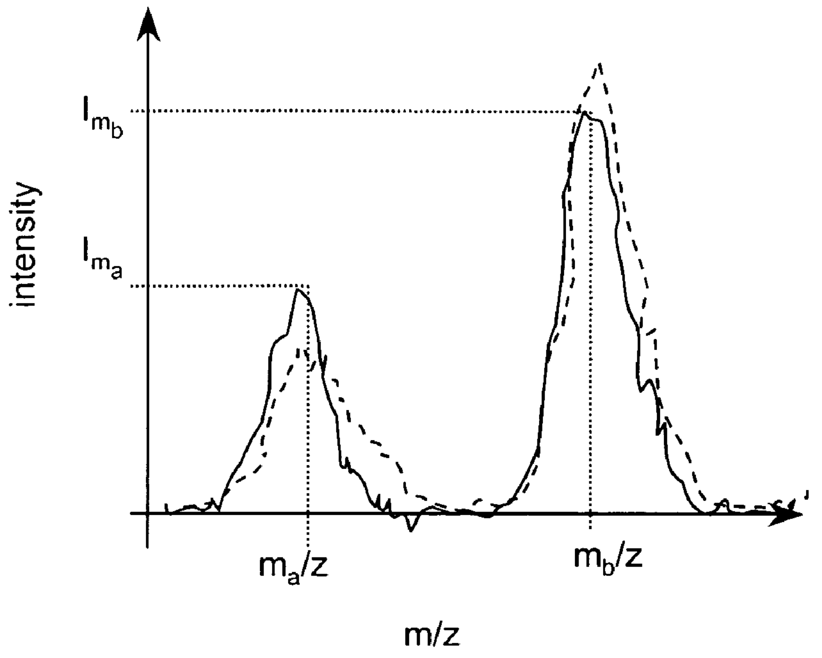
FIG. 6 is a graph showing the relationship between m/z and intensity for a "trap" type mass spectrometer which allows two ion intensities to be measured while maintaining the real intensity difference or average ratio.
Figure 7:
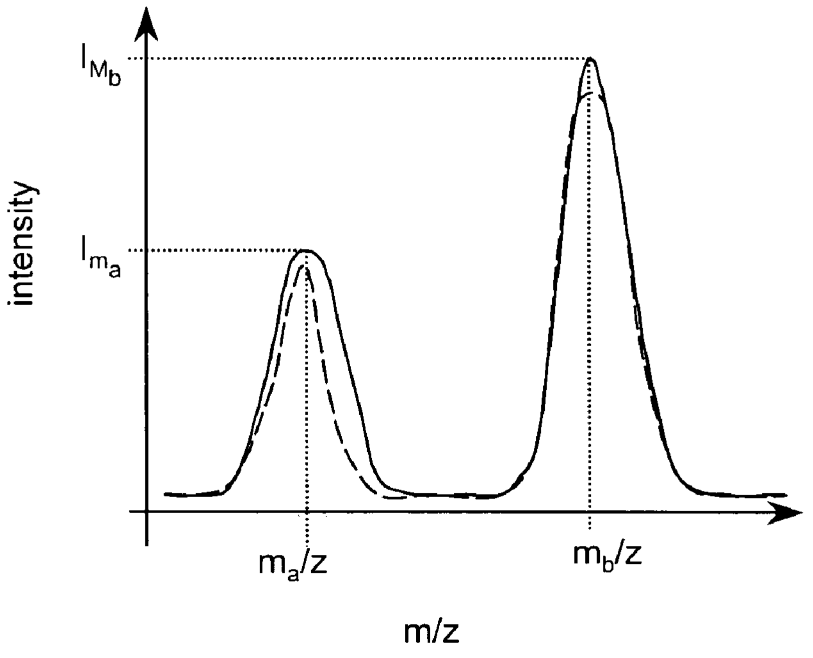
FIG. 7 is a graph showing the relationship between m/z and intensity for a "beam" type mass spectrometer which does not necessarily allow two ion intensities to be measured while maintaining the real intensity difference or average ratio.

FIGS. 6 and 7 shows an illustration of the measurement necessary for such an experiment in contrast to FIGS. 4 and 5. FIG. 6 shows the results for two measurements using a pulsed type analyzer such as an ion trap while FIG. 7 shows the results when a beam type instrument such as a quadrupole mass filter is used. In FIG. 6, it can be seen that the relative ratio (or difference) of the two peaks is maintained. While in FIG. 7, the noise associated with the source can independently effect the relative ratio (or difference) in the measurements limiting the usefulness of these methods for beam type machines.

Depending on the nature of the noise and whether the noise is multiplicative or additive, the measured intensity ratio or intensity difference of two distinct peaks will be the same as that which it would have been if there were no source instability and is the key to the improved method. In addition, since the contribution of the source instability is common to the independent measurements of the two ion intensities, both the contribution of the variance due to the source and the contribution of the variance due to the ion statistics can be determined. By utilizing two or more ion intensity measurements, these methods therefore provide a significant improvement in the ability to determine the number of ions and the detector gain in the presence of noise or when using relatively unstable ion sources.

The mathematical details for implementing these techniques are now described.

The determination of gain of a detector based on statistical methods relies on the fact that the statistical variance of a measured ion current under the appropriate conditions is controlled by Poisson statistics. According to Poisson statistics, the conditions that define the Poisson distribution are met when the events being measured are discreet events and are randomly distributed over some sampling interval. The probability of detecting an event during some sampling interval, Δt, is constant during the time interval and proportional to Δt, and where the probability for detecting more than one event is negligible as the sampling interval becomes small.

Under these conditions, Poisson statistics dictates the variance, $\sigma_N^2$, is directly related to the number of events or, in this case, ions detected, N by $N=\sigma_N^2$. To account for the effects of the arbitrary scaling and digitization of the measured intensities, let I be the measured intensity values, where I=k*G*N. k is the transfer function of the detector electronic circuitry (which is known) and G is the gain of the electron multiplier/dynode combination. By using the fact that $\sigma=k*G*\sigma_N$, the number of ions N can be determined by measuring a mean intensity, $\overline{\mu_1}$, ($\overline{\mu_1}=k*G*\overline{N}$), and its standard deviation, $\sigma_1$, and using the resulting relationship $$N=\left(\frac{\overline{\mu_1}}{\sigma_1}\right)^2.$$

Once, N, the number of ions measured is known, the detector gain G can then simply be calculated using the input total charge of these N ions and the measured output charge after electron multiplication. The output charge can readily be calculated given a measured or digitized intensity, since the transfer function, k, of the detector electronics associated with the output of the multiplier is fixed and known from the circuitry. Therefore, $$G=\frac{\frac{\overline{\mu_1}}{k}}{N}.$$

As stated previously, the critical component of the process of determining the gain is to accurately determine N, the number of ions measured.

To derive an approach that works in the presence of noise such as ion source instability based on intensity measurements for ions of multiple m/z values, we first let $N_a$ be the number of ions for a first $m_a/z$, and $N_b$ be the number of ions for a second $m_b/z$. Let the intensity of each ion when no source instability is present be $I_a$ and $I_b$ with corresponding standard deviations of $\sigma_a$ and $\sigma_b$ respectively. Also, similar to the discussion above, $I_a=k*G*N_a$ and $I_b=k*G*N_b$, with their associated standard deviations $\sigma_a=k*G*\sigma_{Na}$ and $\sigma_b=k*G*\sigma_{Nb}$. As before, k is the transfer function of the detector electronic circuitry (which is known) and G is the gain of the electron multiplier/dynode combination. Recall also the Poisson relationship that $N_a=\sigma_{Na}^2$ and $N_b=\sigma_{Nb}^2$. We now discuss three possible approaches for eliminating source instability in the calculation of the average number of ions detector and the detector gain according to the techniques described herein.

The Ion Ratio Approach:

In a first approach, let the contribution of the source instability to the intensities be S and the measured intensities of the first and second m/z be $I_{ma}$ and $I_{mb}$ respectively. In this case, the ion source noise is multiplicative and so $I_{ma}=I_a*S$ and $I_{mb}=I_b*S$ with associated standard deviations $\sigma_{ma}$, $\sigma_{mb}$, $\sigma_S$. For this approach, measurements are taken of the ratio of the two ion intensities $$\frac{I_{ma}}{I_{mb}},$$

along with at least one intensity measurement, say $I_{ma}$. Let the mean value of the intensity ratio be $$\overline{I_{mR}}=\overline{I_{ma}/I_{mb}}=\frac{\overline{(I_a*S)}}{\overline{(I_b*S)}}=\overline{I_a}/\overline{I_b}=\overline{I_R}.$$

The associated standard deviation of $\overline{I_{mR}}$ is $\sigma_{mR}$. By the propagation of errors it is defined by $$\sigma_{mR}^2=\left(\frac{\sigma_{ma}^2}{(\overline{I_{ma}})^2}+\frac{\sigma_{mb}^2}{(\overline{I_{mb}})^2}\right)*(\overline{I_{mR}})^2.$$

Now if the instability is truly random, then $\overline{S}=1$ and this will make $\overline{I_{ma}}=\overline{I_a}, \overline{I_{mb}}=\overline{I_b}$ and $\sigma_{mR}^2=\sigma_R^2$.

Due to the identities given above, $$\sigma_{mR}^2=\left(\frac{\sigma_a^2}{(\overline{I_a})^2}+\frac{\sigma_b^2}{(\overline{I_b})^2}\right)*\left(\frac{(\overline{I_a})}{(\overline{I_b})}\right)^2.$$

For this situation the affects of S are eliminated. Consequently, by measuring the average ion intensity ratio, $\overline{I_{mR}}$, and its associated standard deviation $\sigma_{mR}$, then the relationship $$\sigma_R^2=\left(\frac{\sigma_{Na}^2}{N_a^2}+\frac{\sigma_{Nb}^2}{N_b^2}\right)*(\overline{I_{mR}})^2$$

which is based on substitutions using $I_a=k*G*N_a$ and $I_b=k*G*N_b$, along with their associated standard deviations $\sigma_a=k*G*\sigma_{Na}$ and $\sigma_b=k*G*\sigma_{Nb}$ can be rearranged to yield that the average number of ions in any given first peak can be determined by $$\overline{N_a}=\frac{(\overline{I_{mR}})^2(1+\overline{I_{mR}})}{\sigma_{mR}^2}.$$

Given that the number of ions N is now determined, calculation of the detector gain G is straight forward using the transfer function of the detector electronics, k, the measured average intensity of the single peak, $\overline{I_{ma}}$, and by using the relationship $$G = \frac{\frac{\overline{I_{ma}}}{k}}{\overline{N_a}}.$$

The overall equation for the gain is $$G = \frac{\overline{I_{ma}} * \sigma_{mR}^2}{k(\overline{I_{mR}})^2(1 + \overline{I_{mR}})}.$$

The Ion Intensity Difference Approach:

In a second approach, the source of noise is considered to be additive (including negative deviations) and so $I_{ma}=I_a+S$ and $I_{mb}=I_b+S$ with associated standard deviations $\sigma_{ma}$ and $\sigma_{mb}$. For this approach, the intensity difference of the two ions is measured, where $I_{mD}=(I_a+S)-(I_b+S)=I_a-I_b$, with a mean measured value of $\overline{I_{mD}}=\overline{I_D}$ and associated standard deviation which is $\sigma_{mD}$. Similar to the discussions above, $\overline{I_{ma}}=\overline{I_a}$, $\overline{I_{mb}}=\overline{I_b}$ and $\sigma_{mD}=\sigma_D$ can be shown to be true when $\overline{S}=0$, which is true for random instability. The propagation of errors in this case defines that $\sigma_D^2=\sigma_{Ia}^2+\sigma_{Ib}^2$. Given this relationship, and by measuring $\overline{I_{ma}}$, $\overline{I_{mb}}$ and $\overline{I_D}$ along with its associated standard deviation $\sigma_{mD}$, the average number of ions in a given peak can be determined by $$\overline{N_a} = \frac{(\overline{I_{ma}})}{(\overline{I_{ma}} + \overline{I_{mb}})\sigma_{mD}^2}$$

with the gain being calculated using $$G = \frac{\sigma_{mD}^2}{k * (\overline{I_{ma}} + \overline{I_{mb}})}.$$

The General Simultaneous Equation Approach:

In a third approach, a more general method for determining the number of ions in n number of masses, the gain for the detector G, the contribution of the variance from the ions, and the magnitude of any common mode noise such as the source instability, is obtained.

In this method, again, the source of noise is considered to be multiplicative, and so $I_{ma}=I_a*S$ and $I_{mb}=I_b*S$ with associated standard deviations $\sigma_{ma}$, $\sigma_{mb}$, $\sigma_S$. Now consider the individual measurements $I_{ma}$ and $I_{mb}$, including the noise S. The propagataion of error gives that $$\sigma_{ma}^2 = \left(\frac{\sigma_{Ia}^2}{(\overline{I_a})^2} + \frac{\sigma_S^2}{(\overline{S})^2}\right) * (\overline{I_{ma}})^2$$

and $$\sigma_{mb}^2 = \left(\frac{\sigma_{Ib}^2}{(\overline{I_b})^2} + \frac{\sigma_S^2}{(\overline{S})^2}\right) * (\overline{I_{mb}})^2.$$

With appropriate substitution these become $$\sigma_{ma}^2 = \left(\frac{1}{\overline{N_a}} + \frac{\sigma_S^2}{\overline{S}^2}\right) * (\overline{I_{ma}})^2$$

and $$\sigma_{mb}^2 = \left(\frac{1}{\overline{N_b}} + \frac{\sigma_S^2}{\overline{S}^2}\right) * (\overline{I_{mb}})^2.$$

As before, $\overline{S}=1$ for random instability and so the relationships simplify to $$\sigma_{ma}^2 = \left(\frac{1}{\overline{N_a}} + \sigma_S^2\right) * (\overline{I_{ma}})^2$$

and $$\sigma_{mb}^2 = \left(\frac{1}{\overline{N_b}} + \sigma_S^2\right) * (\overline{I_{mb}})^2.$$

These two equations can be used with the relationship that $$\overline{N_a} = \frac{\overline{I_{ma}}}{\overline{I_{mb}}} * \overline{N_b}.$$

At this point, there are three equations and three unknowns $\overline{N_a}$, $\overline{N_b}$, and $\sigma_S^2$. Solving these simultaneous equations yields $$\overline{N_a} = \frac{\overline{I_{mb}} * \overline{I_{ma}^2}(\overline{I_{mb}} - \overline{I_{ma}})}{I_{mb}^2\sigma_{ma}^2 - I_{ma}^2\sigma_{mb}^2}.$$

From this, the gain is derived to be $$G = \frac{I_{mb}^2\sigma_{ma}^2 - I_{ma}^2\sigma_{mb}^2}{k * \overline{I_{mb}} * \overline{I_{ma}}(\overline{I_{mb}} - \overline{I_{ma}})}.$$

It can be seen that any number of ions can be used in this general method. And, in fact, various forms of the noise either multiplicative or additive can be combined and the contribution of each could be determined.

Although the techniques described herein are ideally suited for ion trapping instruments, under the correct conditions, it may also be applied to beam type mass analyzers.

The correct conditions are when the source of fluctuation is of a substantially low frequency, such that the measuring time for both of the ions is small compared to the change in intensity due to the instability. Under such conditions, the ion intensity can be measured at the two points and the assumptions for the methods are satisfied. If the fluctuation is of a substantially high frequency, then the noise component may not be substantially the same for each measurement taken. For example, if one measurement is taken at a peak in the noise while another at a trough, the success of the method would be since the noise could not be substantially cancelled out.

Utilizing a trapping-type mass analyzer versus a beam machine provides an additional feature that can further optimize the results obtained using the techniques described herein. The nature of these analyzers makes it possible to optimize the value of the ion intensities that are measured, before the measurements take place. Since the ion accumulation is a separate operation from the analysis of the ions, the time that ions are accumulated or trapped can be altered or optimized. For example, if the measured intensities are too small, the noise component of the source instability may be too large for the method to yield reproducible results. On the other hand, if the measured intensity is too high, the detector may saturate and invalidate the measurements. For trapping-type instruments, the accumulation time can be adjusted to give the appropriate intensity measurements to give optimised results. Alternatively, also for trapping instruments, the relative ion intensities can be adjusted before measurements are taken. In this case for example, the two intensities can be set to be relatively equal for the ion ratio technique or the average difference can be set to a reasonable value for the difference technique.

The techniques described here can also be applied to other types of pulsed analyzers which include, but are not limited to, time-of-flight (TOF) mass analyzers, Fourier transform-ion cyclotron resonance (FT-ICR) mass analyzers, quadrupole ion trap mass analyzers and orbitraps. These instruments collect an entire mass spectrum from a single pulse of ions. Pulsed-type mass analyzers are typically capable of separating the functions of ion selection and ion scanning.

Figure 1:
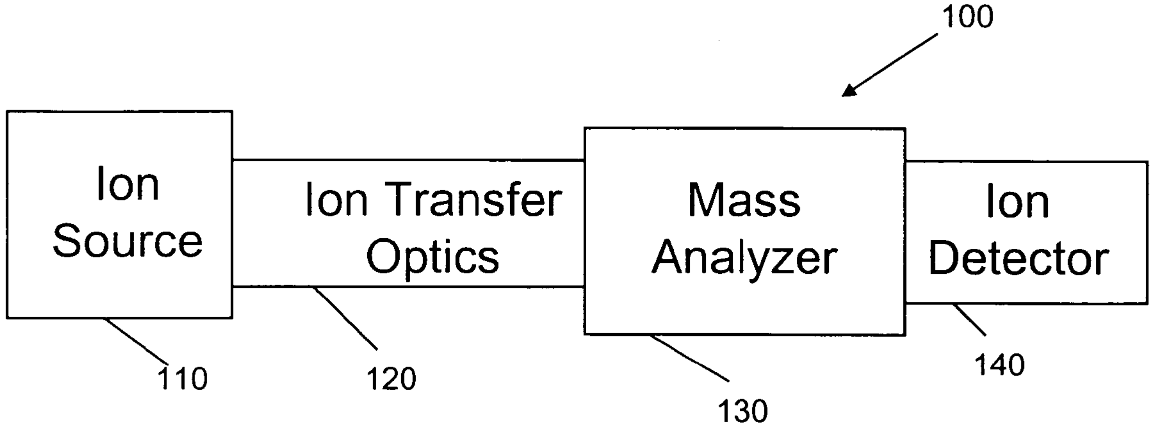
FIG. 1 is a block diagram of the major components of the mass spectrometer.
Figure 2:
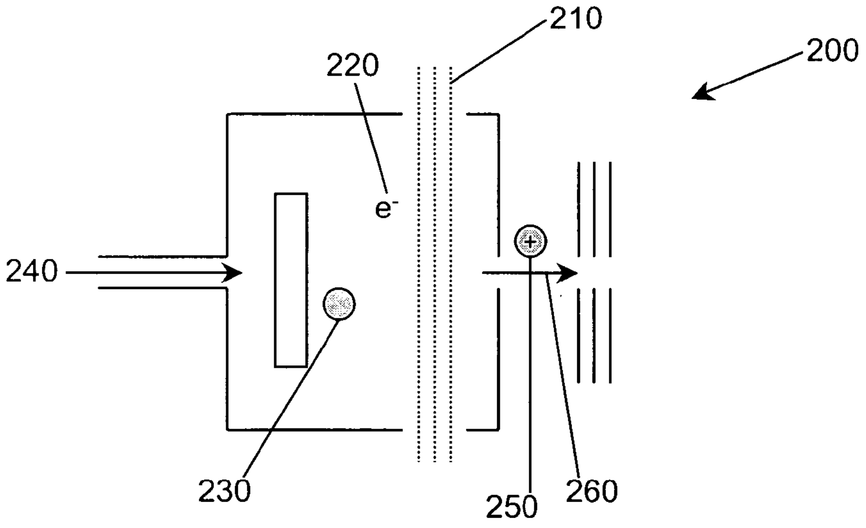
FIG. 2 is a schematic diagram of an Electron Ionization source.
Figure 3:
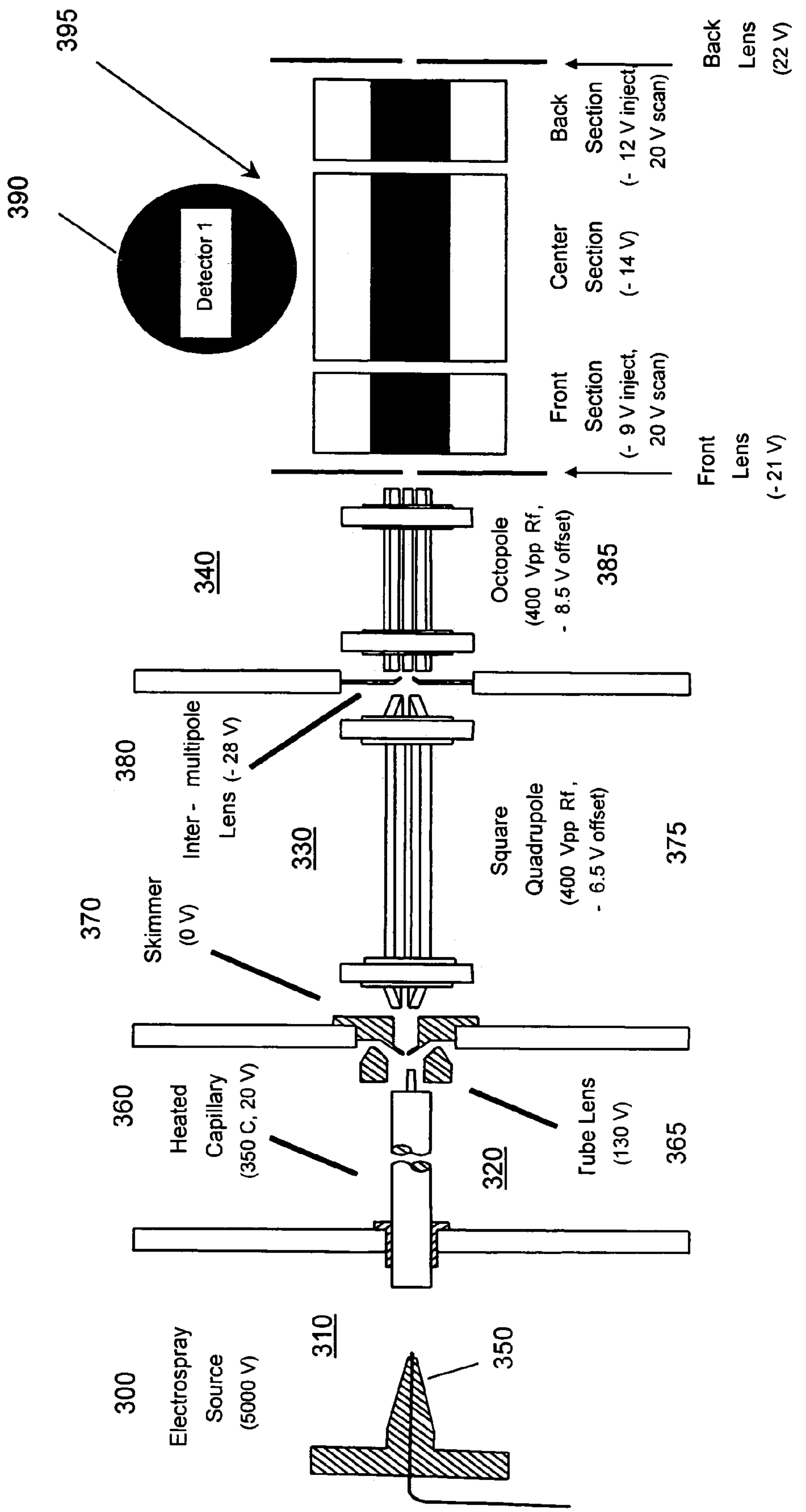
FIG. 3 is a schematic illustration of an apparatus capable of implementing a method for measuring the gain of a detector according to one aspect of the invention.

Embodiments of the current invention will now be demonstrated and further described using a 2-D linear quadrupole ion trap mass spectrometer, as is described in detail in U.S. Pat. No. 5,420,425. Referring to FIG. 3, a typical 2-D linear ion trap mass spectrometer is schematically illustrated. The instrument includes a suitable ion source such as an electrospray ion source 300 in a chamber 310 at atmospheric pressure. Ions formed in the chamber 310 are conducted into a second chamber 320, which is at a lower pressure such as 1.0 Torr via a heated capillary 360, and directed by a tube lens 365 into skimmer 370 in a wall of a third chamber 330 that is at still a lower pressure, for example $1.6\times10^{-3}$ Torr. A heated capillary and tube lens is described in U.S. Pat. No. 5,157,260.

The ions entering the third chamber 330 are guided by a quadrupole ion guide 375 and directed through inter-multipole lens 380 to the vacuum chamber 340 at a still lower pressure, for example $2\times10^{-5}$ Torr. This chamber houses the linear ion trap 395. An octopole ion guide 385 directs the ions into the two-dimensional quadrupole (linear) ion trap 395. Typical operating voltages, temperature, and pressures are indicated on the drawing. Other ion transfer arrangements can be used to transfer ions from the ion source at atmospheric pressures to the ion trap at the reduced pressure.

The above arrangement can be utilized according aspects of the current invention to provide a way to compensate for a temporally unstable source by measuring the ratio, difference, or absolute intensities of the ion beam at two or more different m/z values, where the ions of the two or more m/z values were obtained from the ion source at substantially the same time. All ions of interest are first accumulated for some period of time in the trap. The beam is then shut off and the intensity of the trapped ions may then be measured. Since the number of ions trapped is linearly dependant on the accumulation time, a linear relationship is expected between accumulation time and the number of ions detected. This provides a simple means to test the techniques described herein. The test includes accumulating ions for various amounts of time which is increasing linearly, and applying the techniques to determine the number of ions for each accumulation time. The plot should then show a linearly increasing dependency.

Figure 8:
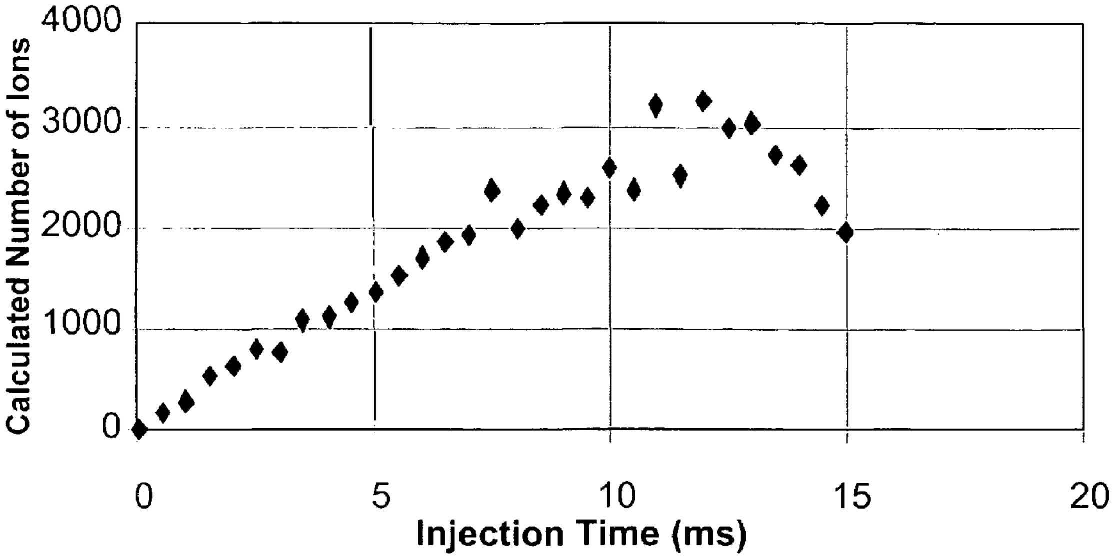
FIG. 8 is a plot of the experimentally determined number of ions as a function of accumulation time in an ion trap using a method according to one aspect of the invention. The expected linear function is observed up to 10 msec of accumulation time.

FIG. 8 demonstrates the results of one implementation of the invention by measuring the ion intensity ratio of the m/z 524.3 versus the $C^{13}$ isotope peak at m/z 525.3, from a temporally unstable source. 500 measurements of each ion intensity and their ratio were made for each determination, along with the associated standard deviation of these measurements. The calculated number of ions at the various ion accumulation times using the ion ratio method was then plotted. The resulting calculated number of ions is shown to be linear for injection times up to approximately 10 msec indicating the methods ability to track the accumulation time as expected. Above 10 msec, the measured ion intensities are now limited by effects due to saturation of the detector, and possibly other sources of instability which are not common to both peaks such as electronic noise with frequencies above 5.5 KHz.

Figure 9:
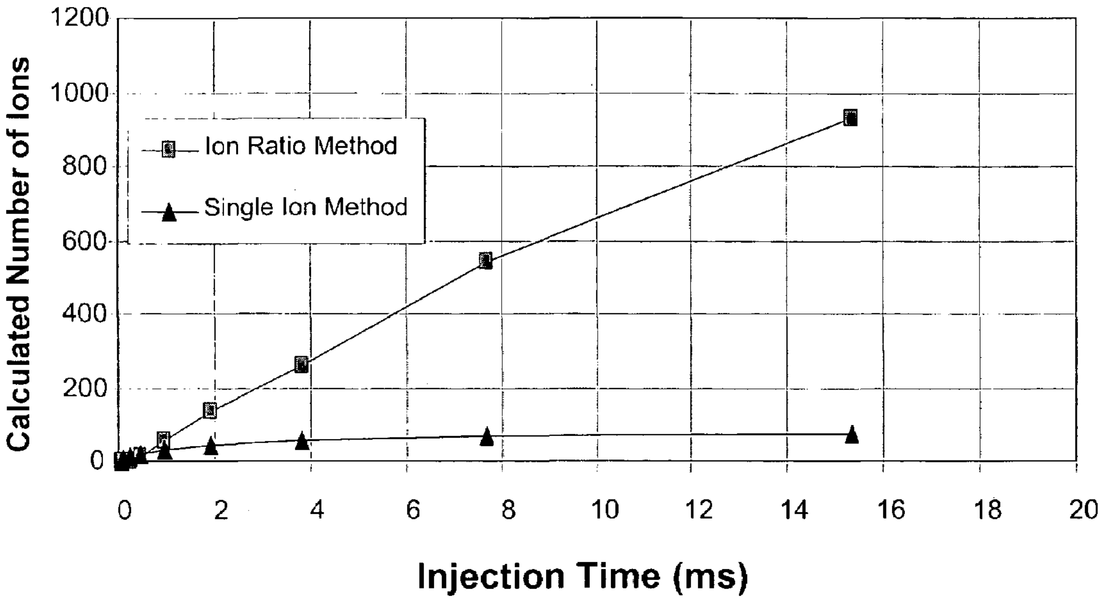
FIG. 9 is a plot of the experimentally determined number of ions as a function of accumulation time in an ion trap using a method according to one aspect of the invention, compared to the corresponding number using a single ion Poisson technique, indicating the clear improvement in accurately determining the number of ions detected.

In a similar experiment, FIG. 9 demonstrates the effectiveness of the invention by comparing the results obtained in one implementation of the techniques, namely the ion ratio method, described herein with the single ion Poisson technique described above. Due to the instability of the ion source, the single ion technique shows a calculated number of ions that is erroneously remains constant as the injection time increases. The technique described herein, on the other hand, shows the expected linear response with injection time and therefore offers a substantially higher working range than the single ion technique.

The effectiveness of the various methods described here using different source and instrument types is shown in Tables 1–3.

TABLE 1

EI Source on Beam Machine

| Gain Method | Number of ions | Calculated Gain | % RSD from ions | % RSD from source |
|---|---|---|---|---|
| Fies | 2400.91 | 14487.8 | 2.04085 | |
| Ratio | 2440.07 | 14211.6 | 2.02441 | |
| Difference | 2369.64 | 14633.9 | 2.05427 | |
| Simult Eq. | 2554.87 | 13572.9 | 1.97840 | 0.501228 |

TABLE 2

Typical Electrospray Source on 2D Ion Trap

| Gain Method | Number of ions | Calculated Gain | % RSD from ions | % RSD from source |
|---|---|---|---|---|
| Fies | 170.455 | 732849 | 7.65938 | 0 |
| Ratio | 1467.56 | 85119.5 | 2.61036 | 7.20084 |

TABLE 2-continued

| Typical Electrospray Source on 2D Ion Trap | | | | |
|---|---|---|---|---|
| Gain Method | Number of ions | Calculated Gain | % RSD from ions | % RSD from source |
| Difference | 367.994 | 339457 | 5.21289 | 5.61176 |
| Simult Eq. | 1605.23 | 77819.4 | 2.49592 | 7.24131 |

TABLE 3

| Unstable Electrospray Source on 2D Ion Trap | | | | |
|---|---|---|---|---|
| Gain Method | Number of ions | Calculated Gain | % RSD from ions | % RSD from source |
| Fies | 29.9608 | 4283970 | 18.2693 | 0 |
| Ratio | 1687.94 | 76040.0 | 2.43400 | 18.1065 |
| Difference | 74.1676 | 1730560 | 11.6116 | 14.1046 |
| Simult Eq. | 1514.74 | 84734.8 | 2.56939 | 18.0878 |

Table 1 shows and compares the results of the various methods for determining the number of ions and the detector gain for a beam type instrument. In particular, the results obtained using a magnetic sector mass spectrometer equipped with an EI source. As discussed, this ion source is a relatively stable source and so the results obtained show that there is little difference among the methods including the single ion method of the prior art. The data supports that the source is relatively stable suggesting only 0.5% instability. In contrast, Table 2 shows and compares the results of various methods for determining the number of ions and the detector gain for an ion trap mass spectrometer with an ESI ion source. In particular, the results in table 2 have been obtained on the 2-D Linear trap equipped with an ESI source. It can be seen that for this source, the method of using ion ratios or simultaneous equations gives the best results indicating 1467 and 1605 ions respectively with gains of 85119 and 77819. Comparing this to the single ion method which indicates only 170 ions and gains of over 730000. In this case, the difference method also does not yield good results due to the fact that the noise is mostly multiplicative. The results indicate that the instability due to the source is greater than 7%, while the ions themselves show approximately 2.6% variation. Table 3 shows and compares the results of the various methods for determining the number of ions and the detector gain for an ion trap mass spectrometer with an ESI source having an increased instability. The results in Table 3 have been obtained under the same conditions as in Table 2, except that the source was made even more unstable by adjusting the electrospray voltage applied to the needle. The results show that the single ion method gives even worse results giving significantly lower numbers of ions of only 30 ions and higher gains of over 4280000, while the ratio and simultaneous equation methods, give values more similar to the numbers given in Table 2 as expected. In this case, the data shows that the source instability has increased to over 18%, while the ion variation was still approximately 2.5%, again showing the effectiveness of the invention for calculating the number of ions and the detector gain in the presence of noise due to source instability.

The invention can be implemented in digital electronic circuitry, or in computer hardware, firmware, software, or in combinations of them. The methods of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the description above has been written in terms of ion beams. The techniques of the current invention, however, could equally be applicable to electron beam devices.

What is claimed is:

1. A method of operating a mass spectrometer, the mass spectrometer including a source of ions, a mass analyzer, and a detector, the method comprising:

calculating a ratio of intensity values for at least two ions having different m/z values; and calculating a gain of the detector based at least in part on the ratio of intensity values.

2. The method of claim 1, wherein:

calculating a gain of the detector based at least in part on the ratio of intensity values includes calculating a gain G according to the formula:

$$G = \frac{\overline{I_{ma}} * \sigma_{mR}^2}{k(\overline{I_{mR}})^2(1 + \overline{I_{mR}})}$$

where $\overline{I_{ma}}$ is a measured average intensity of a single peak corresponding to one of the at least two ions, $\sigma_{mR}^2$ is the square of a standard deviation of the ratio, k is a transfer function associated with the detector, and $\overline{I_{mR}}$ is the ratio of intensity values.

3. The method of claim 1, further comprising:

accumulating in the mass analyzer ions generated by a source of ions;

transmitting ions from the mass analyzer to the detector, the ions being selectively transmitted according to their respective m/z values; and measuring intensity values for the transmitted ions to obtain the intensity measurements for the ions having a plurality of different m/z values.

4. The method of claim 3, wherein:

the source of ions is temporally unstable.

5. The method of claim 3, wherein:

the intensity measurements obtained for ions having a plurality of different m/z values have a substantially constant instantaneous variation contribution.

6. The method of claim 5, wherein:

the substantially constant instantaneous variation contribution includes a contribution from instability of the source of the ions.

7. The method of claim 3, wherein:

accumulating ions includes accumulating ions generated by the source of ions at substantially the same time; and measuring intensity values includes measuring intensity values for at least two of the ions generated by the source of ions.

8. The method of claim 3, wherein:

accumulating ions includes accumulating ions for an accumulation time, the accumulation time being selected to optimize the intensity measurements.

9. The method of claim 1, wherein:

the mass analyzer includes a pulsed-type analyzer.

10. The method of claim 1, wherein:

the mass analyzer includes a trapping-type analyzer.

11. The method of claim 1, wherein:

the source of ions includes an ion source selected from the group consisting of an electrospray ionization source, atmospheric pressure chemical ionization sources, atmospheric pressure photo-ionization sources, atmospheric pressure photo-chemical-ionization sources, matrix assisted laser desorption ionization sources, atmospheric pressure MALDI sources, and secondary ions ionization sources.

12. The method of claim 1, wherein:

the mass analyzer includes a mass analyzer selected from the group consisting of ion trap mass analyzers, Fourier Transform ion cyclotron resonance mass analyzers, orbitrap mass analyzers, and time of flight mass analyzers.

13. The method of claim 1, wherein:

the detector includes an electron multiplier.

14. A mass spectrometer, comprising:

a source of ions;

a mass analyzer configured to accumulate ions from the source of ions and to selectively transmit the accumulated ions according to their respective m/z values;

a detector configured to receive ions transmitted by the mass analyzer, the detector being operable to generate a signal representing an intensity of ions of each detected m/z value; and control means operable to calculate a ratio of intensity values for at least two ions having different m/z values, and to calculate a gain of the detector based at least in part on the ratio of intensity values.

15. A computer program product on a computer readable medium for operating a mass spectrometer, the mass spectrometer including a source of ions, a mass analyzer, and a detector, the computer program product including instructions operable to cause a programmable processor to perform a method comprising the steps of calculating a ratio of intensity values for at least two ions having different m/z values, and calculating a gain of the detector based at least in part on the ratio of the intensity values.

16. A method of operating a mass spectrometer, the mass spectrometer including a source of ions, a mass analyzer, and a detector, the method comprising:

calculating a ratio of intensity values for at least two of the ions having different m/z values; and calculating the number of ions being detected by the detector based at least in part on the ratio of intensity values.

17. The method of claim 16, wherein:

calculating the number of ions based on the ratio includes calculating the number of ions N according to the formula:

$$\overline{N_a} = \frac{(\overline{I_{mR}})^2(1 + \overline{I_{mR}})}{\sigma_{mR}^2}$$

where $\sigma_{mR}^2$ is the square of a standard deviation of the ratio, and $\overline{I_{mR}}$ is the ratio of intensity values.

18. The method of claim 16, further comprising:

accumulating in the mass analyzer ions generated by a source of ions;

transmitting ions from the mass analyzer to the detector, the ions being selectively transmitted according to their respective m/z values; and measuring intensity values for the transmitted ions to obtain the intensity measurements for the ions having a plurality of different m/z values.

19. The method of claim 18, wherein:

the source of ions is temporally unstable.

20. The method of claim 18, wherein:

the intensity measurements obtained for ions having a plurality of different m/z values have a substantially constant instantaneous variation contribution.

21. The method of claim 20, wherein:

the substantially constant instantaneous variation contribution includes a contribution from instability of the source of the ions.

22. The method of claim 18, wherein:

accumulating ions includes accumulating ions generated by the source of ions at substantially the same time; and measuring intensity values includes measuring intensity values for at least two of the ions generated by the source of ions.

23. The method of claim 18, wherein:

accumulating ions includes accumulating ions for an accumulation time, the accumulation time being selected to optimize the intensity measurements.

24. The method of claim 16, wherein:

the mass analyzer includes a pulsed-type analyzer.

25. The method of claim 16, wherein:

the mass analyzer includes a trapping-type analyzer.

26. The method of claim 16, wherein:

the source of ions includes an ion source selected from the group consisting of an electrospray ionization source, atmospheric pressure chemical ionization sources, atmospheric pressure photo-ionization sources, atmospheric pressure photo-chemical-ionization sources, matrix assisted laser desorption ionization sources, atmospheric pressure MALDI sources, and secondary ions ionization sources.

27. The method of claim 16, wherein:

the mass analyzer includes a mass analyzer selected from the group consisting of ion trap mass analyzers, Fourier Transform ion cyclotron resonance mass analyzers, orbitrap mass analyzers, and time of flight mass analyzers.

28. The method of claim 16, wherein:

the detector includes an electron multiplier.

29. A mass spectrometer, comprising:

a source of ions;

a mass analyzer configured to accumulate ions from the source of ions and to selectively transmit the accumulated ions according to their respective m/z values;

a detector configured to receive ions transmitted by the mass analyzer, the detector being operable to generate a signal representing an intensity of ions of each detected m/z value; and control means operable to calculate a ratio of intensity values for at least two of the ions having different m/z values, and calculating the number of ions detected by the detector based at least in part on the ratio of intensity values.

30. A computer program product on a computer readable medium for operating a mass spectrometer, the mass spectrometer including a source of ions, a mass analyzer, and a detector, the computer program product including instructions operable to cause a programmable processor to perform a method comprising the step of calculating a ratio of intensity values for at least two ions having different m/z values, and calculating the number of ions being detected by the detector based at least in part on the ratio of intensity values.

* * * * *